United States Patent [19]

Sampey

[11] Patent Number: 4,926,898
[45] Date of Patent: May 22, 1990

[54] SAFETY CHOKE VALVE

[76] Inventor: Ted J. Sampey, P.O. Box 877, Belle Chasse, La. 70037

[21] Appl. No.: 425,485

[22] Filed: Oct. 23, 1989

[51] Int. Cl.$^5$ .................... F16K 43/00; F16K 51/00
[52] U.S. Cl. ................................. 137/315; 166/91; 251/122; 251/333
[58] Field of Search ............... 137/312, 315; 166/91, 166/97; 175/38, 218; 251/121, 122, 318, 333, 360

[56] References Cited

U.S. PATENT DOCUMENTS

| | | | |
|---|---|---|---|
| 2,590,688 | 3/1952 | Crain | 166/91 |
| 2,893,435 | 7/1959 | Eichenberg | 166/91 |
| 2,943,640 | 7/1960 | James | 166/91 |
| 3,160,427 | 12/1964 | Natho | 166/91 |
| 4,337,788 | 7/1982 | Seger | 137/315 |
| 4,444,220 | 4/1984 | Seger | 137/315 |

FOREIGN PATENT DOCUMENTS 475320  7/1951  Canada .................. 251/122

Primary Examiner—George L. Walton
Attorney, Agent, or Firm—Thomas S. Keaty

[57] ABSTRACT

The invention relates to a safety chock valve having improved body top. An upper part of the valve body has a tapered wall cavity which receives in a sealed engagement a tapered lower part of the valve bonnet. An internally threaded cap member secures sealed position of the bonnet on the valve body. Even partial disengagement of the threads causes breaking of the sealed engagement and escape of pressure between the valve body and the bonnet.

30 Claims, 2 Drawing Sheets

SAFETY CHOKE VALVE

BACKGROUND OF THE INVENTION

The present invention relates to valves, and more particularly a safety choke valve having an improved choke body top.

Adjustable and positive safety choke valves have been widely used in the oil and gas industry for controlling the flow of liquid, such as oil or gas from a well head. These valves are designed to adjustably vary the flow of fluid and allow escape of built up pressure to prevent hazardous build up of high pressure in the flow line.

Typically, such valves comprise a valve body having an L-, T-, or F- shape with multiple orifices to permit passage of fluid or gases through the valve with the means to restrict the flow through the orifices in that valve to vary the flow of such fluid or gases.

The present invention, more particularly concerns itself with provision of an adjustable or positive valve bonnet and head, which is designed to allow manual/-hand engagement and disengagement when the pressure is below 50 psi, and provides a safety feature which detects excessive pressure in the valve (before the valve is fully disengaged, thereby averting any possible accidents which may harm the person handling the possible disengagement), and further, allows for pressure bleedoff should the gases or fluids in the valve be under excessive pressure, supplementing conventional pressure escape means available in the currently known valves.

Prior to this design, there were many accidents in the field caused by disengagement of the valve from the stem while the valve contained pressure. The prior designs did not allow for the detection of pressure within the valve, and once the cap was fully disengaged, the valve head would blow off of the stem injuring the operator. The present design allows for the detection of pressure from fluids or gases within the valve before the valve is fully disengaged.

SUMMARY OF THE INVENTION

The present invention achieves its objects in a simple and straightforward manner. A choke is provided for mounting in communication with a pressure line, the choke having a substantially cylindrical main body section and a transverse section, each section having a central passageway extending therethrough, the passageways connecting at a right angle to each other. The main section has a lower part provided with a mounting flange and an upper part having external threads thereon. The transverse section, which is integrally attached to the main section, is provided with a similar mounting flange on its free end. The passageway of the transverse section forms an inlet passage, while a lower part of the main body forms a fluid/gas outlet. A frustoconical cavity is formed in the upper end of the main section, the cavity receiving in a fitted engagement a lower frustoconical tapered part of a valve bonnet. A cap member secures the bonnet to the valve body by threadably engaging the threads on the upper valve end. The valve is provided with a primary bleedoff means, and an excessive pressure detection means which also acts as a secondary bleedoff should the need arise. The primary bleed off means is formed in communication with a central passageway of the main body, while the excessive pressure detection means is formed by a passageway which is provided through a displacement of the sealed engagement between the bonnet and the upper valve body. By disengaging at least part of the threads of the cap member and the valve body, the cap member is allowed to move upwardly, thus allowing the internal pressure within the valve to unseat the bonnet, breaking the seal between the bonnet and the valve body, thus forming a passage through which fluids or gases may seep from the valve, thereby alerting the person handling the valve that excessive pressure still remains in the valve and that the cap should be tightened once more to prevent the cap from blowing off the top of the valve. However, should the need arise, the pressure within the valve may bleedoff due to provision of this feature, relieving the valve of excess pressure and allowing the safe removal, for inspection or maintenance, of the valve head/cap. This feature is primarily used for safety purposes, if the operator needs to find out whether there is still pressure in the pressure vessel in excess of normal. By carefully undoing a part of the threads, the operator observes an escape of pressure through the bonnet and therefore resecures the cap.

It is therefore an object of the present invention to provide a choke which provides an excessive pressure detection/safety means.

It is another object of the present invention to provide a choke having an improved top, which has a secondary bleedoff means associated therewith.

It is a further object of the present invention to provide a safety choke valve suitable for use as a positive, as well as an adjustable choke.

It is still another object of the present invention to provide an adjustable choke having an improved body top.

These and other objects of the present invention will be more apparent to those skilled in the art from the following detailed description of the preferred embodiment.

BRIEF DESCRIPTION OF THE DRAWINGS

Reference will now be made to the drawings, wherein like parts are designated by like numerals, and wherein.

DETAIL DESCRIPTION OF THE PREFERRED EMBODIMENT

Figures 1, 3:
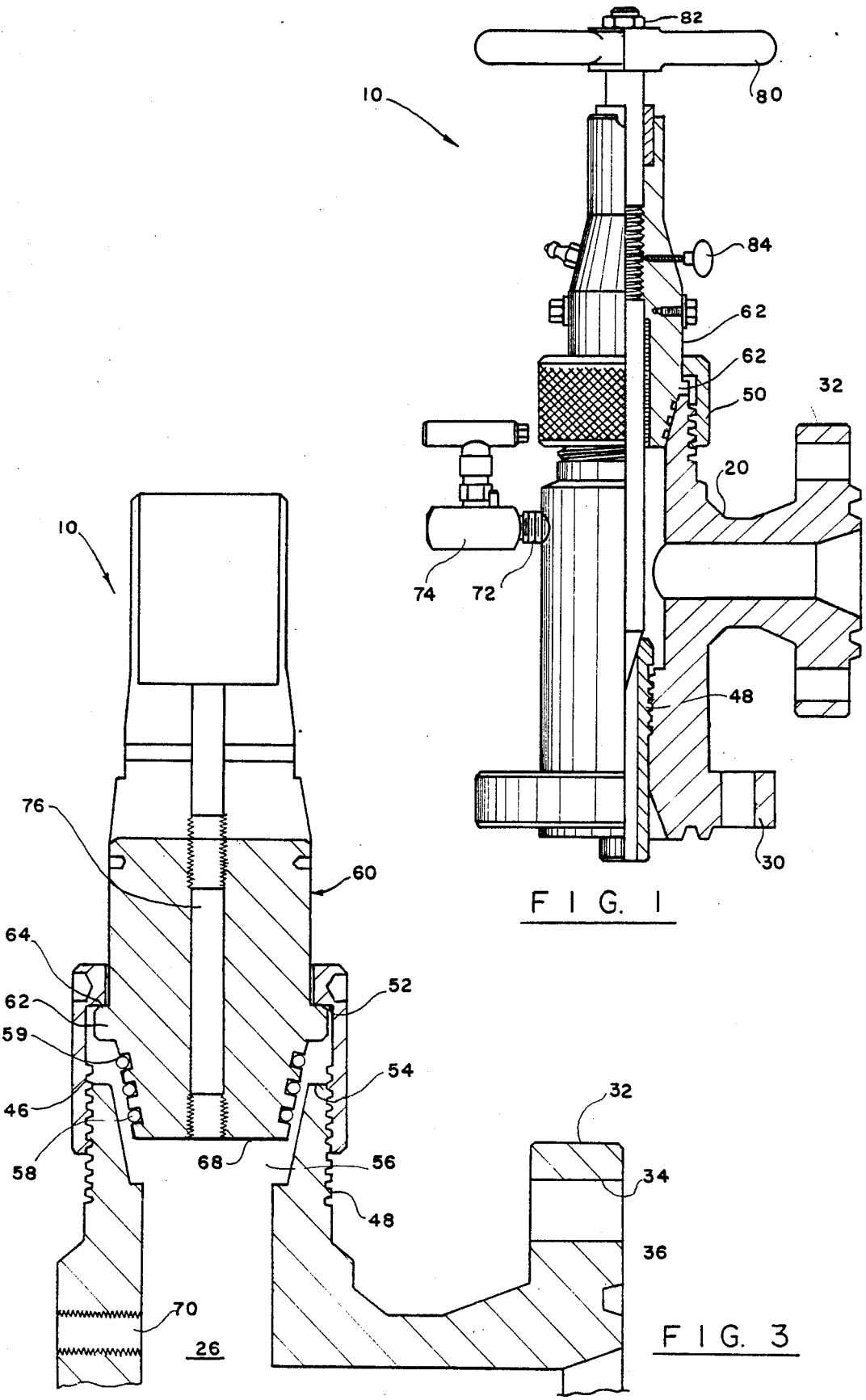
FIG. 1 is a perspective, partially sectional view of the safety choke valve in accordance with the present invention.
FIG. 3 is a cross-sectional, detailed view of the valve with a cap in an unseated position.
Figure 2:
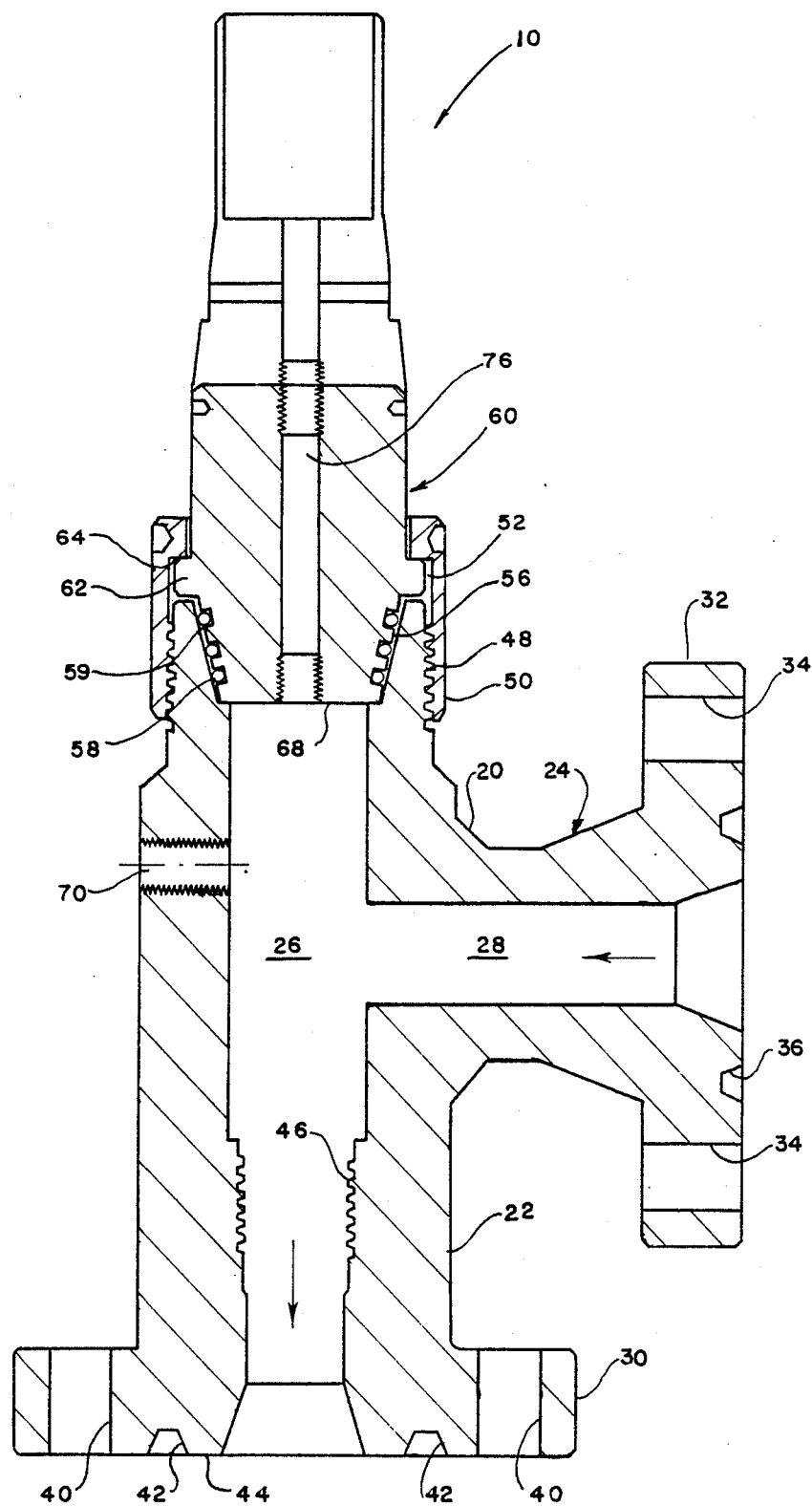
FIG. 2 is a detailed cross-sectional view of the valve and the safety bonnet in a seated position.

Referring to the drawings in more detail, numeral 10 designates an adjustable safety choke valve in accordancee with the present invention. The valve 10 comprises a valve body 20 having a general T-shape, with a main portion 22 and a transverse section 24. The main section 22 is provided with a central opening 26 extending substantially through the entire length thereof. The transverse section 24, which is integrally connected to the main section 22 has a generally frustoconical shape and is provided with a central opening 28 extending through the length thereof and communicating with the opening 26. One end of the section 22 is provided with a mounting flange 30 which surrounds the main section 22 on the exterior thereof.

A free end of the transverse section 24 is provided with a mounting flange 32 which is similar in design to the flange 30 and surrounds the widest portion of the transverse section 24 on the outside thereof. The transverse section 24 forms an inlet portion of the valve, admitting the fluid or gas under pressure and allowing it to flow into the opening 26 and exit opening 26 adjacent the flange connection 30.

The mounting flange 32 is provided with holes 34 to allow bolting of the flange to a flanged conduit or a flanged connection of a flowline under pressure. Annular groove 36 in the end face 38 of the flange 32 is provided to receive a sealing ring (or other sealing means, not shown).

The flange 30 is likewise provided with openings or holes 40 to receive bolts, so as to connect the flange 32 to a flanged connector of a conduit or a pressure vessel. An annular groove 42 in the end face 44 of the flange 30 is provided to receive a sealing means (not shown) therein.

Opening 26 in its lower portion is provided with a length of internal threads 46, which matingly engage and support in sealing relationship external threads of a flow choke bean body 48 (shown in FIG. 1). An upper exterior portion of the body section 22 is provided with a length of external threads 48 which are designed to matingly engage internal threads of a choke body top or cap member 50. The cap member 50 has a substantially hollow cylindrical body having an internal bore 52 through the entire length thereof. The bore 52 has a lower portion formed by internal sidewall of the cap 50, which is occupied by threads for threadably engaging the cap 50 to the exterior of the valve 20, and an upper portion which is free of threads and which has an enlarged diameter, so as to form annular space between the non-threaded exterior of the valve 20 and an internal wall of the cap member 50.

A choke bonnet 60 is secured in place to an upper part of choke body section 22 by a tubular cap 50. The cap member 50 has an internal flange or shoulder 64 which abuts top shoulder of an enlarged diameter portion 62 of the bonnet 60, so as to secure supporting bonnet tightly on the valve body 20. The bonnet 60 is formed with an internal opening 76 which is internally threaded to receive a valve stem 78 and secure it therein.

An upper part of the generally cylindrical opening 26 is formed as a frustoconical tapered opening, with a widest portion of the opening being adjacent a top edge 54 of the valve section 22. The bonnet 60 having a bottom portion of a matching angular shape is fitted within the opening 56 and is sealed against the wall of the opening 56 with a plurality of O-rings, or other suitable seal, 58 which are engaged within grooves 59 formed in the frustoconical, tapered part of the bonnet 60. The enlarged diameter cylindrical part 62 of the bonnet 60 rests with its bottom surface on top 54 of the valve body section 22.

An annular space 52 is allowed to extend between the interior of the cap member 50 and enlarged diameter portion 62.

The bonnet 60 is seated within the valve body cap member 50 in a fitting engagement, without the use of hammering as was conventional with older type valves. The choke bean within the choke valve body 22 is seated by hand in a conventional matter.

In the field it is sometimes necessary to inspect the choke bean for possible erosion by sand and other abrasive elements present in a production well. Typically, such inspection is conducted once a week. In that case, the cap 50 of the device is unthreaded manually, by hand, and the bonnet 60 is removed from its seated position in the body section 22. Any pressure of about 50 psi or less is safely released through the opening 26, and access is obtained to the choke bean threaded to the threads 46. If any erosion is detected, the choke bean is changed. This operation takes place when the device is used as a positive safety choke valve.

Sometimes pressure is trapped in the pressure container due to a number of factors, and if more than 50 psi is present in the pressure container, the cap 50 is designed so that it cannot be removed by hand. This would indicate to the operator that excessive pressure greater than 50 psi is trapped in the pressure container.

Should there be pressure less than 50 psi still present in the pressure container the cap can be removed by hand. To safely perform this procedure, the operator would apply torque to the cap 50, disengaging the threads 48, possibly as little as ¼ of a turn. If the pressure of less than 50 psi exists, the O-ring seals 58 become immediately unseated, and the pressure can be detected escaping through the bonnet/valve connection. This safety feature allows for safe operation of the valve to prevent any possible accidents at the production site during inspection or maintenance.

The valve of the present invention when used as an adjustable valve, is provided with a dual bleedoff means to control excessive pressure built up within the flow line. The side bleedoff is engaged within an opening 70 which is interiorly threaded to receive an externally matingly threaded nipple 72 of the bleedoff valve 74. A secondary top bleedoff means is provided with the help of the valve cap member 50 and the manner in which the valve bonnet 60 is seated within the opening 56.

When it is necessary to bleed the valve from the top, the valve cap member 50 is disengaged and rotated to at least some degree to disengage the threaded connection of the valve cap 50 and to the valve body 22. The valve cap 50 is thereby moved upwardly along the body of the valve bonnet 60, such that the shoulder 64 of the valve cap 50 is no longer seated against the top surface of the enlarged diameter portion 62. The sealing engagement of the valve bonnet 60 and the valve body 20 is thereby broken under the internal pressure built up within the right angle conduits 28 and 26, with pressure pushing against the bottom 68 of the valve head or bonnet 60, moving it upwardly. A pressure escape conduit is thereby formed between the wall of the tapered cavity 56 and the internal wall of the cap member 50, allowing the fluid or gas under pressure to escape, thus releasing the pressure and preventing hazardous conditions. The O-rings 58 become unseated during this operation. It is contemplated that the valve can be designed to withstand higher pressures, if necessary, with minor variations in the design of the valve itself.

A hand wheel 80 is provided for operating the valve, the wheel 80 being connected to the stem 78 in a fixed or adjustable attachment.

An extreme upper end of the operating stem 78 is threaded to receive a retaining nut 82, so as to secure position of the hand wheel 80 on the stem 78.

A valve indicator 84 is provided to allow adjustment of the pressure within the choke body.

It can thus be appreciated that a novel safety choke body top is provided for use with a valve having a right angle interior opening therein. A dual bleedoff, from the side and top of the valve is permitted through provision of the improved bonnet design, which allows the choke valve of the present invention to be used in safely controlling pressure and volume of liquid or gas. The choke valve of the present invention provides a secure seal of the bonnet, still allowing release of trapped pressure through minor manipulation of the cap.

Many changes and modifications can be made within the design of the present invention without departing from the spirit thereof. I therefore pray that my rights to the present invention be limited only by the scope of the appended claims.

I claim:

1. A safety choke comprising:
a valve body having an inlet fluid flow passage and an outlet fluid flow passage arranged at a right angle to said inlet flow passage, the valve body being provided with a frustoconical cavity in a valve body top portion;
a bonnet means having a frustoconical lower part matingly tapered to fit in a seated engagement within said cavity; and
means for securing position of said bonnet means on said valve body, said bonnet being partially manually disengaged from said valve body to cause breaking of the seated engagement, so as to determine, by at least partial relief of pressure build up between the valve body and the bonnet, if an excessive pressure exists in the valve body, wherein when the excessive pressure is above a predetermined level said bonnet is prevented from being manually unseated thereby alerting an operator to relieve the pressure through an alternative pressure relief means.

2. The device of claim 1, wherein said valve body top portion is provided with external threads which terminate a distance below a top edge of the valve body.

3. The device of claim 2, wherein said means for securing said bonnet comprises a cap means having an internal opening, a lower part of which is provided with threads to matingly engage the external threads on the valve body top portion.

4. The device of claim 3, wherein said bonnet means is provided with an enlarged diameter portion above the frustoconical lower part, a bottom surface of the enlarged diameter portion resting on the top edge of the valve body.

5. The device of claim 4, wherein the cap means is provided with an internal flange in its uppermost section, a bottom surface of the flange resting on a top surface of the enlarged diameter portion.

6. The device of claim 5, wherein a sealing means is provided between interior of the valve body and exterior of the bonnet means.

7. The device of claim 1, wherein said bonnet means is provided with a central bore in fluid communication with the outlet fluid flow passage.

8. The device of claim 1, further comprising means for mounting said valve body between a fluid flow line and a pressure vessel.

9. A safety choke comprising:
a valve body having an inlet fluid flow passage and an outlet fluid flow passage arranged at a right angle to said inlet flow passage;
means for regulating a fluid flow mounted within said valve body;
a primary bleeder means communicating with said outlet passage; and
a safety pressure detection/secondary bleeder means associated with a choke bonnet mounted in fluid communication with said outlet passage, said bonnet being partially manually disengaged from said valve body to cause fluid communication between said outlet passage and said secondary bleeder means, so as to determine, by at least partial relief of pressure build up between the valve body and the bonnet, if an excessive pressure exists in the valve body, wherein when the excessive pressure is above a predetermined level said bonnet is prevented from being manually unseated, thereby alerting an operator to relieve the pressure through the primary bleeder means.

10. The device of claim 9, wherein said valve body comprises a main body section and a transverse body section, said body sections each having a passageway extending therethrough, the transverse body section passageway forming an inlet passage and intersecting said main body section passageway at a right angle.

11. The device of claim 10, wherein said first bleeder means comprises a passage formed in the main body section and fluidly communicating with said main body section passageway at a level vertically offset from intersection of said inlet passage with the main body section passageway.

12. The device of claim 11, wherein said main body section has a lower part and an upper part, and wherein said outlet fluid flow passage is formed in said lower part.

13. The device of claim 12, wherein said upper part is formed with a generally frustoconical interior cavity co-axial with said main body section passageway.

14. The device of claim 13, wherein said bonnet comprises a bottom part having a generally frustoconical exterior wall and adapted to be complementary seated within said interior cavity formed in the valve upper part.

15. The device of claim 14, wherein a sealing means is provided to effectively seal engagement between said bonnet bottom part and said valve upper part.

16. The device of claim 15, wherein said sealing means comprises a plurality of O-rings fitted within annular grooves formed in the bottom part.

17. The device of claim 16, wherein said bonnet comprises an enlarged diameter shoulder having a lower surface which abuts an upper end of the valve main body section.

18. The device of claim 17, further comprising means for securing said bonnet to said valve body.

19. The device of claim 18, wherein said securing means comprises a substantially cylindrical hollow cap member having an internally threaded lower portion and a flange formed in an upper portion, said flange abutting an upper surface of said bonnet enlarged diameter shoulder.

20. The device of claim 19, wherein said upper part of the valve body is provided with exterior threads for mating by engaging with the threaded portion of said cap member.

21. The device of claim 20, wherein said secondary bleeder means is provided by a passage formed between said bonnet bottom part and said valve upper part when said cap member flange is moved out of its abutment with the bonnet shoulder.

22. The device of claim 21, wherein said bonnet is formed with a central opening to receive a valve stem therein, said opening being in fluid communication with said main body section passageway.

23. A safety choke, comprising:
a valve body having a main section and transverse section, each section being formed with an interior central passageway therethrough, the passageway of the transverse section forming an inlet passage, intersecting at a right angle the passageway of the main section, which forms a fluid outlet passage;
a primary bleeder means comprising a passage in fluid communication with the main section passageway; and
a valve bonnet engaged with an upper end of the valve main section, said bonnet movable between a first seated position and a second unseated position to allow pressure detection and secondary bleeding of pressure built within the valve body, said bonnet being partially manually disengaged from said valve body to cause the second unseated position, so as to determine, by at least partial relief of pressure build up between the valve body and the bonnet, if an excessive pressure exists in the valve body, wherein when the excessive pressure is above a predetermined level said bonnet is prevented from being manually unseated, thereby alerting an operator to relieve the pressure through the primary bleeder means.

24. The device of claim 23, wherein said upper part of the valve body is formed with a generally frustoconical cavity and said bonnet is formed with a generally frustoconical bottom part which complementary fits within the frustoconical cavity in the valve upper part.

25. The device of claim 24, further comprising sealing means for sealing engagement of the bonnet with the valve body.

26. The device of claim 25, further comprising a generally cylindrical hollow cap member having a lower part and a top part, said lower part being provided with internal threads.

27. The device of claim 26, wherein the upper part of the valve body is provided with external threads for matingly engaging internal threads of the cap member.

28. The device of claim 27, wherein said bonnet is formed with an enlarged diameter shoulder having a lower surface and an upper surface, the lower surface abutting an upper end of the valve body.

29. The device of claim 28, wherein said cap member is formed with an internal flange which abuts an upper surface of the enlarged diameter shoulder when the bonnet is in a seated position.

30. The device of claim 29, wherein displacement of the internal flange from its abutment with the enlarged diameter shoulder allows displacement of said bonnet from its engagement with the valve body, thus permitting pressure detection and secondary bleeding of the choke.

* * * * *